(12) United States Patent
Petcu et al.

(10) Patent No.: US 10,133,057 B1
(45) Date of Patent: Nov. 20, 2018

(54) ELECTROWETTING ELEMENT WITH DIFFERENT DIELECTRIC LAYERS

(71) Applicant: Amazon Technologies, Inc., Seattle, WA (US)

(72) Inventors: Cristina Maria Petcu, Eindhoven (NL); Toru Sakai, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 14/977,385

(22) Filed: Dec. 21, 2015

(51) Int. Cl.
*G02B 26/00* (2006.01)

(52) U.S. Cl.
CPC .................. *G02B 26/005* (2013.01)

(58) Field of Classification Search
CPC  G02B 26/004; G02B 26/005; G02B 26/0841; G09G 3/348
USPC ................. 359/290–292
See application file for complete search history.

(56) References Cited

U.S. PATENT DOCUMENTS

| | | | | |
|---|---|---|---|---|
| 8,584,703 B2 * | 11/2013 | Kobrin | ............... | B01F 11/0071 137/597 |
| 8,896,903 B2 * | 11/2014 | Vermeulen | .......... | G02B 26/005 359/228 |
| 2010/0215968 A1 * | 8/2010 | Fields | .................. | C08F 220/24 428/447 |
| 2013/0301108 A1 * | 11/2013 | Lim | ..................... | G02B 26/005 359/290 |
| 2014/0266992 A1 * | 9/2014 | Schram | ................. | G09G 3/348 345/60 |
| 2014/0293397 A1 * | 10/2014 | Novoselov | .......... | G02B 26/005 359/290 |
| 2014/0313177 A1 * | 10/2014 | Van Dijk | ................ | G02B 3/14 345/211 |

FOREIGN PATENT DOCUMENTS

| WO | 03071346 A1 | 8/2003 | |
|---|---|---|---|
| WO | WO 2013087859 A1 * | 6/2013 | .......... G02B 26/005 |
| WO | 2015092050 A1 | 6/2015 | |

* cited by examiner

*Primary Examiner* — Stephone B Allen
*Assistant Examiner* — Rahman Abdur
(74) *Attorney, Agent, or Firm* — EIP US LLP

(57) ABSTRACT

An electrowetting element comprising a first fluid and a second fluid immiscible with the first fluid. A support plate comprises an electrode, a support plate surface and a substrate. An inorganic dielectric layer is located between the substrate and the support plate surface and is transmissive to light in the visible spectrum. An organic dielectric layer is located between the substrate and the support plate surface and is transmissive to visible light. The inorganic dielectric layer has an inorganic dielectric layer deformation behavior and the organic dielectric layer has an organic dielectric layer deformation behavior substantially equal to the inorganic dielectric layer deformation behavior.

19 Claims, 5 Drawing Sheets

ELECTROWETTING ELEMENT WITH DIFFERENT DIELECTRIC LAYERS

BACKGROUND

Electrowetting display devices are known. In an off state of a picture element of an example of such a device an oil layer covers a display area. In an on state the oil layer is retracted so as to cover less of the display area. To switch the picture element to the on state a voltage is applied via for example an electrically conductive fluid and an electrode, the conductive fluid being immiscible with the oil. To switch the picture element to the off state, the voltage is switched off.

Such a device may comprise multiple layers of different dielectric materials as a barrier layer between an electrode and the electrically conductive fluid.

It is desirable to improve the performance of such a barrier layer.

DETAILED DESCRIPTION

Figure 1:
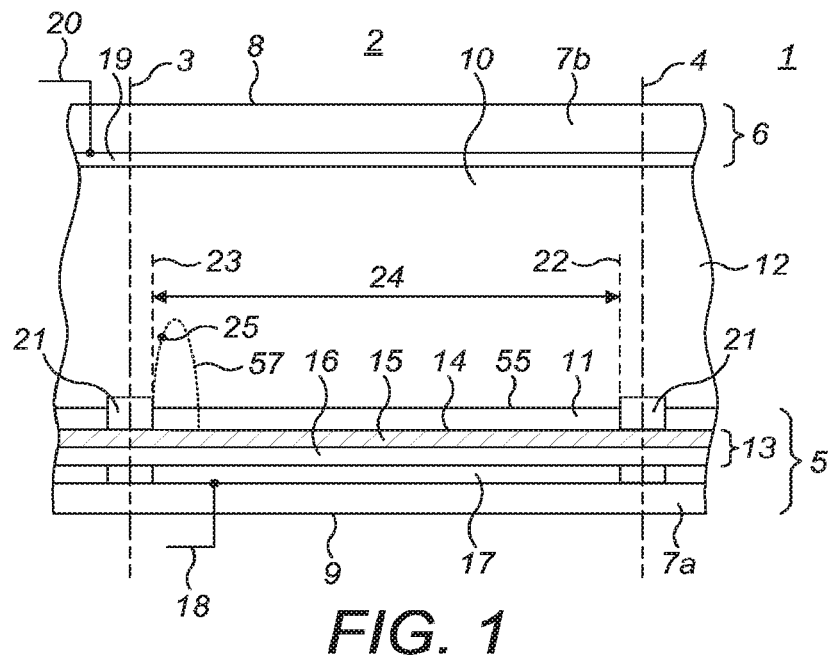
FIG. 1 shows schematically an example electrowetting element.

FIG. 1 shows a diagrammatic cross-section of part of an example of an electrowetting display device 1, including a plurality of picture elements or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, corresponds to the rear side 9; a surface of the second support plate 6, which surface is in this example a surface of the substrate 7b, corresponds to the viewing side 8; alternatively, in other examples, a surface of the first support plate may correspond with the viewing side. The display device may be of the reflective, transmissive or transflective type. The display device may be an active matrix driven or a direct drive display device. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two fluids. In the example of FIG. 1, the space 10 is filled with a first fluid 11 and a second fluid 12, at least one of which may be a liquid. The second fluid is substantially immiscible with the first fluid. Therefore, the first fluid and the second fluid do not substantially mix with each other and in some examples do not mix with each other to any degree. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid. The substantial immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface labelled 55 in FIG. 1 for when no voltage is applied and labelled 57 for when a voltage is applied, which interface corresponds with a boundary between the volume of the first fluid and the volume of the second fluid; this interface or boundary may be referred to as a meniscus. The location and shape of the interface between the first fluid and the second layer in examples is determined by the applied voltage. The thickness of the first and second layers in FIG. 1 is shown as an example; in other examples, the first and/or second layers may have different thicknesses.

The second fluid of the device is at least one of electrically conductive or polar, i.e. the second fluid is electrically conductive, polar, or both, and may be water, or a salt solution such as a solution of potassium chloride in water. The second fluid may be transparent; it may instead be coloured, for example, or absorbing. The first fluid of the device, which is electrically non-conductive, may for example include an alkane like decane or hexadecane, silicone oil or decalin (otherwise known as bicyclo-4,4,0-decane).

Electrically conductive in examples means that the second fluid is capable of conducting electricity; for example an electrical current may flow through the second fluid due to the flow of ions through the second fluid. Polar in examples means that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

The first fluid may absorb at least a part of the visible spectrum. The first fluid may be transmissive for a part of the visible spectrum, forming a colour filter. For this purpose the first fluid may be coloured by addition of pigment particles or a dye. Alternatively, the first fluid may be black, for example absorbing substantially all parts of the visible spectrum, or reflecting. A reflective first fluid may reflect the entire visible spectrum, making the layer appear white, or part of it, making it have a colour. In examples, the first fluid is black and therefore absorbs substantially all parts of the optical spectrum, for example in the visible light spectrum. Typically, substantially all parts of the optical spectrum may include a degree of variation, therefore the first fluid may not absorb all wavelengths, but the majority of wavelengths within a given spectrum such as the visible spectrum, so as to perform the function of the first fluid in the element. The first fluid may therefore be configured to absorb substantially all light incident on the first fluid. For example the first fluid may absorb 90% or more of light in the visible spectrum and incident on the first fluid.

The first support plate 5 includes an insulating layer 13. The insulating layer may be transparent, for example fully transparent, in other words for example transmissive at least to visible light. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing, for example closest to, the space 10 of the display element 2. This surface may be referred to as a support plate surface. The thickness of the insulating layer may be less than 2 micrometers and may be less than 1 micrometer; for example the insulating layer may be 400 nanometers or less in thickness.

In some embodiments, the insulating layer 13 may comprise a hydrophobic material layer 15, such as Teflon AF1600®, and one or more dielectric layers, e.g. referred to as a barrier layer 16 in FIG. 1, with predetermined dielectric properties, the layer 15 facing the space 10, for example being closer to the space 10 than another surface of the layer 15, as shown in the Figure. Typically, if a material or layer is dielectric, it exhibits electrically insulating properties, for example such that the material or layer does not conduct electricity when a voltage is applied across the layer or material. Hence such a layer or material may be referred to as a barrier layer or material, by acting as a barrier against conducting electricity. A material or layer may exhibit dielectric properties up to a given voltage magnitude, over which the dielectric properties may degrade or break down. In examples described herein, an inorganic or organic dielectric layer is for example dielectric for a voltage range used to control an electrowetting element. The barrier layer 16 in examples is formed of a plurality of layers, as will be described in more detail below. The barrier layer 16 may have a thickness, taken in a direction perpendicular to the plane of the substrate, of between 50 nanometers and 500 nanometers.

In the absence of an applied voltage, for example with the applied voltage being a zero voltage, the first fluid 11 adheres preferentially to the surface of the insulating layer 13 for adjoinment by the first fluid, since the surface for adjoinment by the first fluid has a higher, for example greater, wettability for the first fluid than for the second fluid; the surface may therefore be hydrophobic. As will be explained, with the applied voltage being a non-zero voltage or a driving voltage, the surface has a higher wettability for the second fluid than for the first fluid; for example, the surface with the applied non-zero voltage may be considered to be hydrophilic. Wettability relates to the relative affinity of a fluid for the surface of a solid. Wettability may be measured by the contact angle between a boundary of the fluid and the surface of the solid. The contact angle is determined by the difference in surface tension between the fluid and the solid at the fluid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5. In examples shown there is one such electrode 17 per element; in other examples there may be more than one electrode per display element. The electrode 17 is electrically insulated from the first and second fluids by the insulating layer 13; electrodes of neighbouring display elements are separated by a nonconducting layer, although in other examples electrodes of one or more neighbouring display elements may be electrically connected. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The second support plate 6 for example includes a second electrode 19, which may extend between walls of a display element, and/or be disposed, for example located, above and/or covering or overlapping the walls of the display element and/or extend uninterruptedly over a plurality of display elements 2, as shown in the Figure. The electrode 19 is in electrical contact with the second fluid 12 and is common to all display elements. The electrodes 17 and 19 may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7a. The signal lines 18 and 20 are coupled to a display driving system.

The first fluid 11 in this example is confined to a display element by at least one wall, in this example walls 21, that follow the cross-section of the display element. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be part of a surface layer of the support plate that repels the first fluid, such as a hydrophilic or less hydrophobic layer. The walls may extend from the first to the second support plate but may instead extend partly from the first support plate to the second support plate as shown in FIG. 1.

The extent of the display element, indicated by the dashed lines 3 and 4, is determined by the center of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area is in this example hydrophobic. The display effect depends on an extent that the first and second fluids adjoin the surface determined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
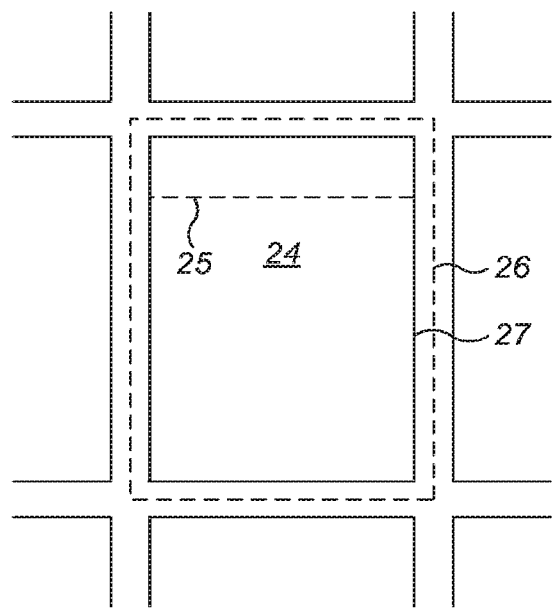
FIG. 2 shows schematically a plan view of the example electrowetting element of FIG. 1.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied between the electrodes 17 and 19, and therefore between the electrode 17 and the second fluid, for example when the electrowetting element is in an off state, the first fluid 11 forms a layer between the walls 21, as shown in FIG. 1. Application of a non-zero voltage will cause the second fluid to displace the first fluid to contract, for example retract, the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 24. For example, switching the fluids to increase adjoinment of the second fluid with the display area may increase the brightness of the display effect provided by the element. This display effect determines the display state an observer will see when looking towards the viewing side of the display device. The display state can be from black to white with any intermediate grey state; in a colour display device, the display state may also include colour.

Examples of a plurality of layers for a support plate of an electrowetting element will now be described with reference to FIG. 3.

Figure 3:
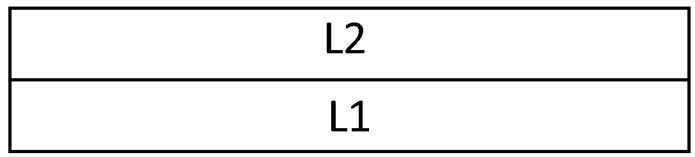
FIG. 3 shows schematically an example of layers of a barrier layer of an example electrowetting element.

FIG. 3 illustrates two layers of a barrier layer according to examples, such as the barrier layer 16 described above. Two layers are illustrated for the purposes of description; in some examples the barrier layer has only two layers as shown, whereas in other examples the barrier layer has a plurality of layers of more than two layers. For example, the plurality of layers may have four layers or more. For example, the barrier layer may comprise a stack of the plurality of layers, with for example alternating inorganic dielectric layers and organic dielectric layers, in other words, progressing layer by layer through the stack, an inorganic dielectric layer, then an organic dielectric layer, then another inorganic dielectric layer, then another organic dielectric layer, etc. In some such examples, the layer of the stack closest to the electrode of the first support plate (such as the electrode 17) is an inorganic dielectric layer and the layer of the stack closest to the first and second fluids is an organic dielectric layer. In some examples the inorganic dielectric layer and the organic dielectric layer contact each other, whereas in other examples those layers may be separated from each other by at least one further layer, such as an adhesion layer explained in further detail below. The barrier layer may in examples, such as that with a stack of the plurality of layers, have a thickness of 400 nanometers or less, the thickness taken in a direction perpendicular a plane of the display area.

Thus, in some examples, the barrier layer may comprise a first inorganic dielectric layer separated from a second inorganic dielectric layer by, and in contact with, a first organic dielectric layer. Further, a second organic dielectric layer may be separated from a first organic dielectric layer by, and in contact with, a second inorganic dielectric layer, with the second organic dielectric layer closer to the support plate surface than the second inorganic dielectric layer. The first and second inorganic dielectric materials may therefore form respectively the first and second inorganic dielectric layers and may be substantially the same within acceptable manufacturing tolerances. Plus, or instead, the first and second organic dielectric materials may form respectively the first and second organic dielectric layers and may be substantially the same within acceptable manufacturing tolerances.

The layer 15 may for example be considered to be a fluid contact layer of the support plate, with the fluid contact layer comprising the support plate surface for contact with at least one of the first fluid or the second fluid. The barrier layer may be between, and in contact with, the electrode such as the electrode 17 and the fluid contact layer.

FIG. 3 illustrates an inorganic dielectric layer L1 and an organic dielectric layer L2. The inorganic layer L1 is for example in contact with a first support plate electrode of an electrowetting element, such as the electrode 17 of FIG. 1. The inorganic dielectric layer L1 comprises an inorganic dielectric material, and may for example be substantially formed of that material, for example 90% or more, for example 95%, substantially 100% (for example 99% or more) or 100% of the layer may comprise the material. The inorganic dielectric layer is transmissive to visible light, in other words for example electromagnetic radiation or light in the visible spectrum, for example 90% or more of wavelengths between 390 nanometers to 700 nanometers are transmittable through the inorganic dielectric layer.

The organic dielectric layer L2 is for example in contact with a layer of the first support plate which contacts at least one of the first and second fluids, for example the layer 15 formed of a hydrophobic material (in other words a hydrophobic layer). The organic dielectric layer L2 comprises an organic dielectric material, and may for example be substantially formed of that material, for example 90% or more, for example 95%, substantially 100% (for example 99% or more) or 100% of the layer may comprise the material. The organic dielectric layer is also transmissive to visible light, which is explained above. The transmission of visible light properties of the inorganic dielectric layer may be substantially (for example within 10% of each other) the same as the transmission of visible light properties of the organic dielectric layer.

The inorganic dielectric layer has an inorganic dielectric layer deformation behaviour. Typically a deformation behaviour is a manner in which the inorganic dielectric layer deforms under a given condition. The deformation behaviour of a layer is for example a consequence of several properties of the layer, for example the specific chemical composition of the layer, such as the material(s) composition forming the layer, the molecular and inter-molecular structure of those materials, for example a degree of crystallinity of the material(s) and/or any inter-molecular forces, a shape of the layer and any treatment that the layer underwent during its fabrication (for example hardening or drying).

The deformation behaviour of a material typically determines how that material, and therefore a structure, element or layer formed of or comprising that material, performs. So, if energy is applied to the material, for example in the form of pressure (such as bending the material) or in the form of temperature (such as heating the material) the deformation behaviour determines for example the level of energy or stress the material is resilient to, how much energy or stress the material can tolerate before deforming, and the extent and nature of deformation for a given amount of energy or stress.

For two layers in contact with each other, each layer may have a different deformation behaviour if each layer is formed of a different material. Consequently, under a given condition, for example input energy such as heat energy or pressure, each layer may deform differently. In the example of an electrowetting element therefore, two layers in contact with each other in a support plate, for example layers of the barrier layer, may deform differently, for example if the electrowetting element experiences an increase in temperature or is bent. Further, energy may be input to one layer by an adjacent layer; for example, an intrinsic stress of the material of one layer may apply a stress (for example a compressive or tensile stress) to another layer in contact with the one layer, or indeed another layer elsewhere in a stack of layers. Stress in a layer and therefore a deformation of a layer can be caused by for example by thermal expansion, plastic deformation, growth morphology, lattice misfit and phase transformation.

In an electrowetting element a difference in deformation behaviour of layers can cause separation of layers otherwise intended to contact each other. This may be tolerable to some degree, for example if the deformation or applied stress is temporary (for example if the electrowetting element is momentarily being bent), but if the deformation is not elastic, and therefore the layer(s) remain deformed or warped from their pre-deformation configuration after the deformation, this can cause permanent damage to the electrowetting element. For example, differential deformation of adjacent layers can cause partial detachment or delamination of the layers from each other, which can for example affect a planarity of a surface of the display area over which the first and second fluids move. Such delamination may occur if at least one of the layers in question has a high compressive stress for example in the range of −200 to −900 MPa (mega Pascals). Lack of planarity of such a surface may create a non-uniform electric field when applying a voltage. Such delamination may occur at locations between two layers where an inter-layer bonding is weaker, for example at a location in an inorganic dielectric layer where there is contamination by organic material. Thus, a lifetime of an electrowetting element may be sub-optimal.

It is therefore desirable to improve the performance of the barrier layer, for example to reduce or prevent such delamination effects. Classes of examples of layers, for example of a barrier layer, will now be described which reduce or prevent such delamination effects. It is to be noted that although a material or materials may be selected which have a reduced or minimal delamination, the selection of materials for the barrier layer is not a trivial matter, as the materials need other properties to sufficiently fulfill their function in the barrier layer. Such properties include for example a sufficient transmission for a sufficiently broad range of visible light wavelengths, a sufficiently high dielectric property combined with a sufficiently small layer thickness to minimise bulk of the barrier layer, fabrication properties which are feasible on a commercial manufacturing scale, materials which are cost effective to purchase and which facilitate cost effective manufacturing of the barrier layer.

In the different examples to be described below, the inorganic dielectric layer L1 has an inorganic dielectric deformation behaviour which is substantially equal to the organic dielectric layer deformation behaviour. Typically therefore, the inorganic dielectric layer and the organic dielectric layer behave in a similar or substantially identical manner when exposed to a given external force, influence or condition. For example, for a given applied pressure, or a given increase in temperature, the organic dielectric layer L2 and the inorganic dielectric layer L1 behave in substantially the same manner. For example an expansion of the layers L1 and L2 is substantially the same, or a rate of bending is substantially the same, within acceptable tolerances, for example the deformation of one of the layers L1, L2 for a given condition may be within 10%, for example within 5%, 4%, 3%, 2%, 1% or less of the deformation of the other of the layers L1, L2. Hence the deformation behaviours may be substantially equal.

A deformation behaviour may be measured using a thin film stress measurement technique or system. Therefore a value representative of a layer's deformation behaviour may be determined. An example of such a technique is now explained, which measures a shape change of a thin film layer during its deposition and a corresponding amount of stress of the layer. Such a thin film layer may be an inorganic or organic dielectric layer as described herein. The stress is determined by measuring the curvature change of pre- and post-deposition of the film. This difference in curvature is used to calculate stress by way of Stoney's equation (1909) which the skilled person will readily understand; see the equation below. The equation relates the biaxial modulus of the underlying layer on which the thin film layer is deposited, the thickness of the underlying layer, and the radius of curvatures of pre- and post-process. Curvature is measured by directing a laser at a surface with a known spatial angle. The reflected beam strikes a position sensitive photodiode while geometry of the film is recorded by scanning the surface. Since stress is force normalized by area, it is a field variable, and therefore it cannot be measured directly; only the effect of stress is measurable. The measuring tool is equipped with a heating element for stress monitoring at high temperatures and in some examples a cooling unit that allows a thorough understanding of film properties at temperatures from −65° C. to 500° C., which are of interest when stacking thin film layers that have different behaviours upon temperature.

Stoney's Equation:

$$\sigma^f = \frac{E_s h_s^2}{6 h_f (1 - \vartheta_s)} k$$

where $\sigma^f$ is the stress of the film, $h_f$ is the thickness of the film, $h_s$ is the thickness of the underlying layer, k is the curvature, $E_s$ and $\theta_s$ are the Young's modulus and Poisson's ratio respectively. In a first class of examples, the electrowetting element comprises an adhesion promoter, for example formed as an adhesion layer, (not illustrated in FIG. 3) adhering the organic dielectric layer L2 to the inorganic dielectric layer L1. An adhesion layer typically comprises a material for adhering the layers L1 and L2 together to some degree. For example, the adhesive material may be considered an adhesion promoter material, a primer, an adhesive agent, a coupling agent, a molecular bridging agent or a bonding agent, for improving an attachment of the two layers L1 and L2 to each other compared with an attachment of the two layers L1 and L2 without such an adhesive material. Although the term adhesion layer is used, it is to be understood that the presence of an adhesive material between the layers L1 and L2 is sufficient to be considered an adhesion layer. Therefore, an adhesion layer is not necessarily a generally uniform thickness deposition of an adhesive material between the layers L1, L2.

In examples, the adhesion layer is transmissive to visible light, similar for example to the transmissivity of the inorganic dielectric layer and/or the transmissivity of the organic dielectric layer. In this way, the presence of the adhesion layer may not detrimentally interfere with the colour of the display effect of the electrowetting element.

In some examples, for example any of those described above, the adhesion layer is a monolayer. A monolayer is typically a layer which, on average, or substantially entirely, for example 90% or more of the layer, has a thickness of up to a maximum dimension of one molecule of the adhesive promoter thick. For example, a monolayer has a thickness of less than 5 nanometers, for example a thickness in the range 1 to 5 nanometers. Hence, relative to a thickness of the inorganic and organic dielectric layers, the adhesion layer is notably thinner. Such thicknesses are taken in a direction perpendicular a plane of the display area. With the adhesion layer being a monolayer for example, a desired adhesion can be obtained without significantly changing the bulk properties of the barrier layer, for example the optical properties of the barrier layer, compared with a barrier layer without the adhesion layer. Thus, as a monolayer, the adhesive promoter may include a material which in greater bulk would have a lower than desired transmissivity of visible light, but as a monolayer does not suffer such lower transmissivity.

The adhesion promoter comprises for example at least one of a silane, a siloxane, titanium (Ti), or an organic titanate. As the skilled person will appreciate: a silane for example has the general formula $Si_nH_{2n+2}$ where n is an integer; a siloxane is for example a compound having at least one —[Si—O—Si]— group; and an organic titanate for example is a compound having at least one Ti—O—C group, with O being oxygen and C carbon. More specific examples of such an organic titanate are described below. Examples of a silane include for example hexamethyl disiloxane, $O[Si(CH_3)_3]_2$ or the more general formula $(RO)_3$—Si(—R'Y) with RO, R' and Y being for example those groups listed below in respect of the examples of the organic titanate. In some examples, a thickness of an adhesion promoter layer may be less than a monolayer thick.

In specific examples, such as examples described herein, the adhesion promoter comprises at least one of: hexamethyldisilazane (HMDS), Ti Prime, diphenylsilanediol (AR300-80), or an organosilane (e.g. AP3000 or AP8000). Such adhesion promoters are obtainable for example from suppliers Dow Chemicals, Dupont, 3M, Microchemicals, Allresist, Polygel or Chempoint.

In examples, such as those described herein in the first class, the adhesion layer causes a deformation of one of the layers L1, L2 to more closely match a deformation of the other of the layers L1, L2. For example, if one layer L1 bends due to an energy input, the attachment of that layer L1 to the layer L2 via the adhesion layer may cause the layer L2 to bend more similarly to the layer L1 than without the adhesion layer. Thus, with the adhesion layer bonding the layers L1 and L2, a push or pull force may be transferred from one of the layers L1, L2 to the other of the layers L1, L2. Hence, the deformation behaviour of one of the layers L1, L2 may more closely match that of the other of the layers L1, L2, and thus the deformation behaviour of the inorganic dielectric layer L1 may substantially match, or be equal to, the deformation behaviour of the organic dielectric layer L2. Thus, the chances of delamination between the two layers occurring may be reduced, and in some examples eliminated.

In examples, a substantially equal deformation behaviour is where at least one of the organic dielectric layer or the inorganic dielectric layer has a low tensile stress, for example each within the range of 100 to 150 MPa (mega Pascals).

Examples in accordance with the first class will now be described, with reference to FIGS. 4a, 4b, 4c and 4d. It is to be appreciated that although the label L1 is used in each of FIGS. 4a, 4b, 4c and 4d, the methodology applied between FIGS. 4a to 4d modifies at least one property, to form the inorganic dielectric layer L1 for an electrowetting element.

In such examples, the inorganic dielectric layer L1 comprises a silicon nitride compound having for example an amorphous structure and with the formula a-SixNyHz (where x=2-3, y=4-5 and z=1.5-2.5); the adhesion promoter comprises an organic titanate compound for example having the formula $(RO)_n$—Ti—(—OXR'Y)$_{4-n}$ (where $(RO)_n$ is a hydrolysable group with n as an integer; X is a binding functional group such as phosphate, sulphonyl, or carboxyl; R' is an aliphatic group, or for example a butyl, octyl or non-polar isopropyl group; Y is for example a cryl, methacryl, or an amino group); and the organic dielectric layer comprises polyimide (a polymer of monomers each having the general formula —[$R^1$C(=O)N(—$R^2$)C(=O)]—) and for example the composition $C_{22}H_{10}N_2O_5$. A specific example of a polyimide is for example SUNEVER 3140, SE-6414, SE-7492 and NCDF-401-3 each of which is available from Nissan Chemical Industries, Ltd. The presence of such an adhesion promoter material, despite in examples being present in relatively small amounts, may be detected using photoelectron spectroscopy, for example by detecting binding energy peaks corresponding to C1s orbitals of C—O and C—N bonds, and also Ti 2p orbitals. A method of manufacturing a barrier layer comprising such an inorganic and organic dielectric layer L1, L2 will now be described using FIGS. 4a, 4b, 4c and 4d, and FIG. 5.

Figure 4A:
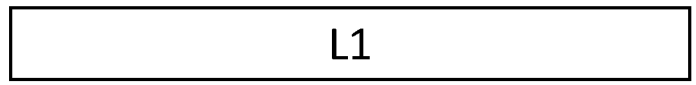
FIGS. 4a, 4b, 4c and 4d schematically illustrate examples of manufacturing a barrier layer.

Referring to FIG. 4a, the inorganic dielectric layer L1 is provided. Underlying layers are not illustrated, but it is to be appreciated that the inorganic dielectric layer L1 may be provided on an electrode layer, for example, such as the electrode 17 of the first support plate described above, or an organic dielectric layer where for example the barrier layer comprises a plurality of alternating organic and inorganic dielectric layers. The inorganic dielectric layer L1 may be provided by forming, for example depositing, an inorganic dielectric layer on or over the underlying layer, more specifically by depositing an inorganic dielectric material on the underlying layer to form the inorganic dielectric layer. The deposition may for example be performed using a dry deposition process, such as depositing the material for example as a vapour, solid or as solid particles. Such a dry process may involve one or more of: a sputtering process, an evaporation process, a chemical vapour deposition process, a plasma enhanced chemical vapour deposition process, or an atomic layer deposition process. In chemical vapour deposition, a substrate may be exposed to one or more volatile precursors in the form of vapours which react and/or decompose on the substrate to deposit the material on the substrate. Plasma enhanced chemical vapour deposition is similar to chemical vapour deposition but involves forming a plasma of the one or more precursors, for example by filling a space between two electrodes with the one or more precursors in the form of vapours and then applying a radio frequency using either alternating current or direct current discharge between two electrodes. In an atomic layer deposition process, precursors react with a surface of a material sequentially, thereby depositing a layer which is for example a dense layer. The skilled person would be readily familiar with such techniques. Further possible deposition techniques include a so-called Spin on Glass process, for example using AZ Spinfil (available from Merck) which is a poly(perhydrosilazane) and is a $SiH_2NH$ based inorganic material which can be spun on an underlying surface to form a layer. The AZ Spinfil material can be converted after deposition to pure and dense $SiO_2$. Another material which may be deposited using a Spin on Glass process is methylsiloxane for Spin on Glass available from Dow Cornings Corporation for example.

Figure 4B:
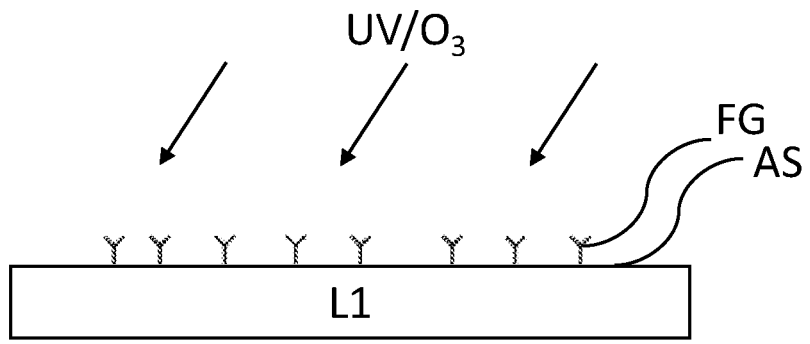

Then, referring to FIG. 4b, a surface of the inorganic dielectric layer L1 is treated to generate an activated surface AS of the inorganic dielectric layer. The treatment may activate the surface by functionalising the surface with functional groups FG for bonding to an adhesive promoter compound. For example, the treatment may comprise exposing the surface to ultraviolet (UV) light together with ozone gas. The UV light causes the ozone to form oxygen radicals which react with for example organic compounds on the layer surface, to form volatile hydrocarbon compounds for example which disperse from the surface. This may be considered a cleaning process which removes organic contaminants and generates available chemical bonding sites which are functionalised ready for bonding to the adhesion promoter. Such bonding sites may be —OH groups for bonding for example to —O-alkyl or —O—ISO groups of an adhesion promoter, where ISO is for example an isopropyl radical.

Figure 4C:
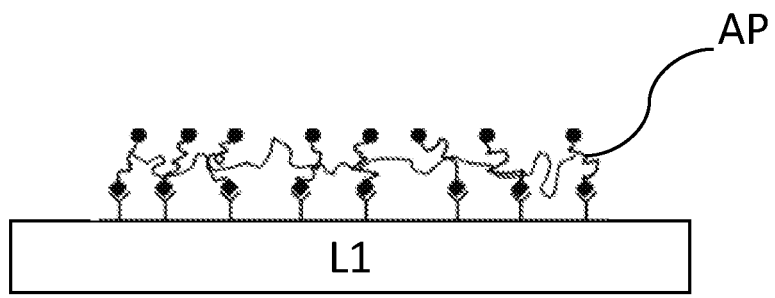

Referring now to FIG. 4c, an adhesion promoter AP layer is formed, for example deposited, on the activated surface AS. The adhesion promoter AP of the AP layer in this example is an organic titanate such as Ti Prime available from MicroChemicals GmbH. The adhesion promoter AP layer is for example deposited using a spin coating technique, though a spray coating or dip coating may be used additionally or alternatively. In spincoating, as the skilled person will readily appreciate, a liquid material is applied, for example deposited, at or close to the centre of an underlying layer which is then rotated to spread the liquid material across the underlying layer by centrifugal force. In spray coating, the adhesion promoter material may be sprayed on the activated surface, and in dip coating the activated surface may be dipped in the adhesion promoter material, again as the skilled person would readily understand.

With the activated surface being functionalised, the adhesion promoter material bonds more strongly to the inorganic dielectric layer compared than if the surface of the inorganic dielectric layer was not functionalised.

The adhesion promoter may be deposited to form an adhesion layer on the inorganic dielectric layer L1. The adhesion layer may be for example a monolayer, and therefore the amounts of adhesion promoter deposited are selected accordingly.

Figure 4D:
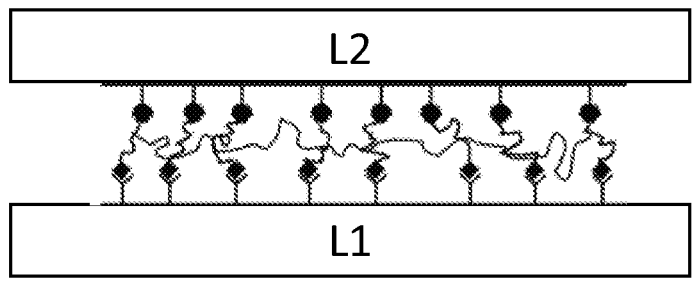
Figure 5:
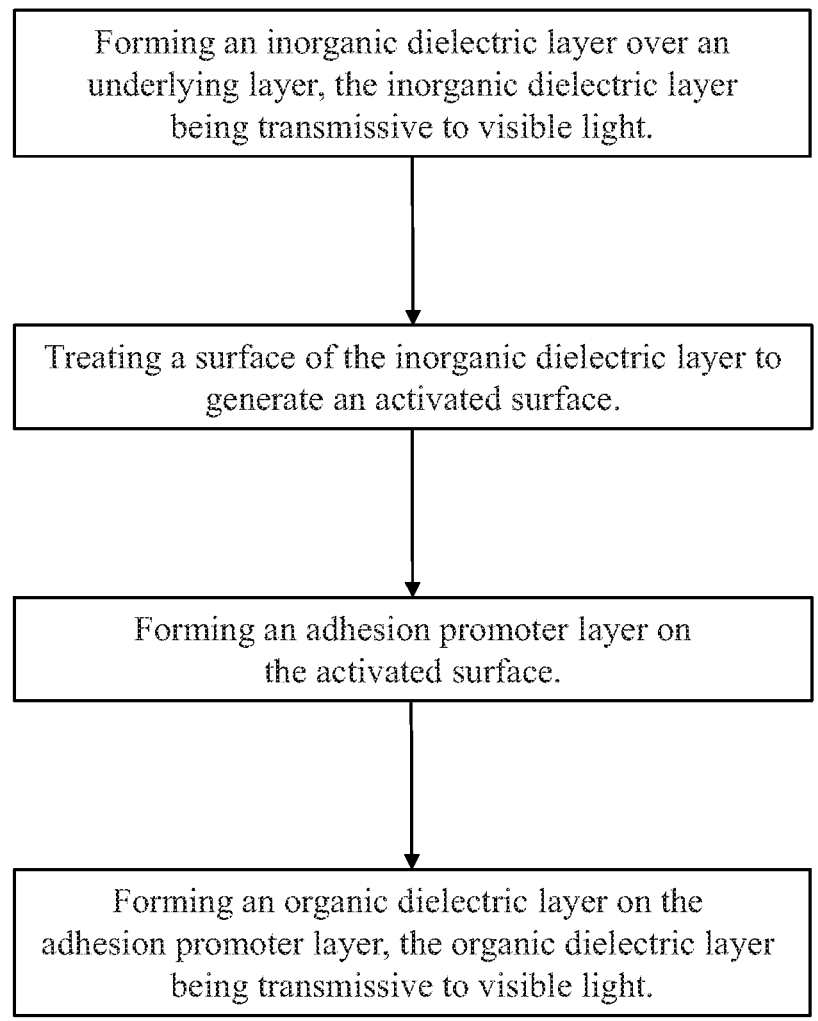
FIG. 5 is a flow diagram relating to examples of a method of manufacturing a barrier layer.

Referring now to FIG. 4d, an organic dielectric layer L2 is then formed, for example deposited, on the adhesion promoter. The organic dielectric layer may be formed by depositing an organic dielectric material such as that described above, for example polyimide, using for example a spin coating, slot die coating, flexoprinting, spray coating or inkjet printing technique. Slot die coating involves applying a liquid through a slot onto an underlying layer, which may be passed underneath the slot by rollers for example, and in flexoprinting a layer of a liquid material is transferred onto a roller or plate with a desired pattern. A scraper, known in the art as a "doctor blade", removes an excess of the liquid material from the roller. Then the substrate is sandwiched between the roller or plate and an impression cylinder to transfer the liquid material to an underlying layer. The liquid material may then be dried. Such techniques, including inkjet printing, will be readily understood by the skilled person.

The adhesion promoter adheres to the organic layer, for example with carbon atoms of the Ti—O—C— group bonding via hydroxyl groups or oxygen atoms of the organic dielectric material, for example of the polyimide. Thus, the adhesion promoter can be considered to act as a transitioning agent, by transitioning the material properties of the inorganic dielectric material to the material properties of the organic dielectric material, to facilitate better adhesion between the layers L1, L2.

After depositing the organic dielectric layer, at least one further layer may be deposited on the organic dielectric layer. In some examples, a layer of a hydrophobic material, for example a hydrophobic layer 15 described previously, may be deposited on the organic dielectric layer. In some other examples, further layers of the barrier layer may be deposited, to build a larger stack of layers. For example, another layer of the inorganic dielectric material may be deposited on the organic dielectric layer L2. For example, the barrier layer may comprise four layers: a first inorganic dielectric layer L1, a first organic dielectric layer adhered to the first inorganic dielectric layer L2 by the adhesion promoter, a second inorganic dielectric layer deposited on the first organic dielectric layer L2, then a second organic dielectric layer adhered to the second inorganic dielectric layer by an adhesion promoter. Each of these layers may for example be approximately 100 nanometers thick. A hydrophobic layer such as that of layer 15 may then be deposited on the barrier layer.

Subsequent to the steps described above, wall material may be applied, for example deposited as a wall material layer, on the hydrophobic layer, either directly or indirectly. The wall material may then be patterned to form at least one wall for confining the first fluid to a display area of the second support plate. The wall material may be SU8 and the patterning may therefore be performed using an appropriate photoresist technique as the skilled person will readily understand. Areas of the hydrophobic layer may be treated before applying the wall material, to improve adhesion of the wall material to the hydrophobic layer.

The electrowetting element may then be assembled by dispensing a first fluid and a second fluid in a space between the now assembled first support plate and the second support plate.

In a second class of examples, the first inorganic dielectric layer has a first coefficient of thermal expansion (CTE) value, representative of a CTE property or characteristic, and the organic has a second coefficient of thermal expansion value which is for example less than a factor of 10 (in other words less than 10× or 10 times), less than 5× or 5 times, less than 3× or 3 times, less than 2× or 2 times, less than 1× or 1 time or approximately equal (within measuring tolerances) to the first coefficient of thermal expansion value. Thus, it may be considered that a value of the first coefficient of thermal expansion is within an order of magnitude of the value of the second coefficient of thermal expansion; hence the first and second coefficients of thermal expansion may be considered to be matched. In this way, the inorganic layer deformation behaviour and the organic layer deformation behaviour may be substantially equal.

As the skilled person will understand, the coefficient of thermal expansion typically represents an expansion characteristic or behaviour of a material or layer in dependence on temperature. It is possible to adjust the CTE of a material or layer comprising a material by for example selecting the chemical composition of the material and/or by tuning a fabrication process, for example a deposition process. By controlling the configuration of molecules of the material as they are synthesised and/or deposited, the physical properties of the material can be tuned, and therefore the CTE of the material too. For example, for a polymeric material, such as an organic dielectric layer for example polyimide, depositing the polymer molecular chains in a more elongate or stretched configuration, can reduce a CTE value of a material compared with the polymer molecular chains deposited in a more bent or tangled configuration, where with heat energy the bent or tangled polymer molecules can expand towards a more stretched configuration, which in turn expands the material. For example, a CTE value of such a tuned material may be 3-10 parts per million (ppm) for the range 100 to 150 degrees Celsius, −0.59 ppm for the range 100 to 450 degrees Celsius, and/or −2.48 for the range 100 to 500 degrees Celsius.

In some examples of the second class, the second coefficient of thermal expansion value may be selected to be approximately zero (within measuring tolerances). This may help to adjust a deformation behaviour of the organic dielectric layer, to substantially equal the deformation behaviour of the inorganic dielectric layer. Selecting an approximately zero CTE value may be achieved by depositing polymer molecules in a stretched configuration as described above.

In some examples of the second class, the inorganic dielectric layer may have a CTE value of approximately 1 to $5 \times 10^{-6}$ Kelvin$^{-1}$, for example the inorganic dielectric layer may comprising silicon nitride which may have a CTE value of approximately $3 \times 10^{-6}$ Kelvin$^{-1}$. In contrast the organic dielectric layer may have a CTE value in the range of 30 to $60 \times 10^{-6}$ Kelvin$^{-1}$, for example where the organic dielectric layer comprises an organic material such as polyimide. By tuning the deposition or application of the organic dielectric material, for example to stretch the molecular polymer chains, the CTE value of the organic dielectric layer may be reduced to for example a comparable CTE value to that of the inorganic dielectric layer, for example in the range 1 to $5 \times 10^{-6}$ Kelvin$^{-1}$, for example approximately $3 \times 10^{-6}$ Kelvin$^{-1}$, in other words within an order of magnitude as explained above.

In a third class of examples, a stress of at least one of the inorganic dielectric layer or the organic dielectric layer may be reduced. A stress of a layer is typically representative of an inherent or intrinsic stress within a material forming the layer. This stress may in some cases be a net overall stress as a combination of regions of tensile stress and regions of compressive stress within the layer. Such stresses are for example a consequence of contamination in the layer, for example organic particles in a generally inorganic material layer, and/or stresses caused by the molecular structure of the material. This may be due for example to a degree of crystallinity or amorphosity (for example how amorphous a material is) of a material.

A stress of a material or a layer can be tuned by controlling for example a deposition of the material. For example, deposition of an inorganic dielectric material to form an inorganic dielectric layer may be performed using for example sputter deposition, physical vapour deposition, chemical vapour deposition, plasma-enhanced chemical vapour deposition or atomic layer deposition.

Where for example the inorganic dielectric material is silicon nitride, this material may be deposited using plasma-enhanced chemical vapour deposition. The stress of the layer (whether overall a compressively (or negatively) stressed layer or a tensile (positively) stressed layer) being deposited can be controlled, by controlling for example a gas composition. For example, a layer may be applied upon introducing a gas or liquid precursor to a plasma. For example, silicon nitride may be deposited from argon (Ar), ammonia ($NH_3$), silane ($SiH_4$), nitrogen ($N_2$) and/or hydrogen ($H_2$), silicon dioxide may be deposited from hexamethyldisiloxane (HMDSO) liquid and oxygen ($O_2$) and aluminium oxide may be deposited from trimethylaluminium liquid (TMA) and Argon (Ar) gas. In the case of silicon nitride, controlling a ratio of silane to ammonia controls the stress of the layer being formed. For example, this can be considered to be a changing of a stress from an overall compressive to overall tensile stress for the layer, and in some examples the inorganic dielectric layer may have a stress of approximately zero. In other examples, an inorganic dielectric layer has a tensile stress.

For example by changing a power during a gas deposition process such as plasma-enhanced chemical vapour deposition, the stress of a layer can be tuned. Increasing power can change the stress of the layer from compressive to tensile. Also, increasing a deposition temperature and pressure can promote more tensile stressed layers to be formed. Further, e.g. where silane and ammonia are used in the deposition, increasing the silane:ammonia ratio can promote more tensile stressed layers. By increasing a radio frequency (RF frequency) a more compressively stressed layer may be formed. And increasing a proportion of silane only may promote a more compressively stressed layer.

In particular examples, it has been found that increasing a ratio of ammonia to silane from 5 to 8 and reducing the power from for example 1500 watts (W) to 800 watts desirably decreases compressive stress in the inorganic dielectric layer. More specifically, with a flow of 3000 sccm (standard cubic centimeters per minute) of nitrogen, 400 sccm of ammonia and 50 sccm of silane, with a power of 800 watts, a dielectric layer of silicon nitride may be formed with a compressive stress of −200 mega Pascals, which has desirable properties for a inorganic dielectric layer of a barrier layer, in accordance with examples described herein.

By tuning the stress of the inorganic dielectric layer, a deformation behaviour of the layer can in turn by tuned. With less intrinsic stress, a layer is less prone to deform for example upon energy input or even of its own accord. Thus, tuning a stress of a layer can enable the deformation behaviour of inorganic and organic dielectric layers to be substantially equal or matched. Or, if for example an organic dielectric layer has a compressive stress, the inorganic dielectric layer may be deposited with a corresponding tensile stress, to counteract the compressive stress of the organic dielectric layer, and therefore reduce an overall susceptibility of the two layers to deform, thus rendering a deformation behaviour of both the inorganic dielectric layer and organic dielectric layer substantially equal.

It is to be appreciated that examples of any of the first, second and third classes may be combined. For example, an adhesion promoter material may be used to adhere inorganic and organic dielectric layers, with either of those layers also having a tuned CTE value and/or stress of the layer. In this way, a deformation behaviour of at least two layers of a stack of a plurality of dielectric layers in a barrier layer can be substantially matched.

It is to be appreciated that although examples of materials are given above, this is not an exhaustive list and further examples are envisaged, based on the principles of the first, second and third classes described, which use different materials than already described.

A list of example inorganic and organic dielectric materials follows below. Before that, it is to be appreciated that the inorganic and organic dielectric layers and materials of a barrier layer need to meet certain requirements in order to function to a desired performance level in an electrowetting element. Identifying and tuning such materials is not a trivial matter given the number of factors to consider when designing an electrowetting element. Examples of such properties are now listed, with an organic dielectric material of the organic dielectric layer, and an inorganic dielectric material of the inorganic dielectric layer each respectively comprising at least one of: a resistance to electric field degradation in the presence of an applied voltage of up 50 volts magnitude, a dielectric constant substantially equal to or higher than 3.5, a water vapour transmission rate less than $10^{-5}$ g/m²/day or less than $10^{-4}$ g/m²/day (g is grammes, and m is meters), or a leakage current of less than 0.1 nA/cm² (nA is nano-amps and cm is centimeters).

An organic dielectric layer of examples described herein comprises more than 80%, more than 90%, more than 95%, approximately 100% or 100% of at least one organic material by weight or by volume and the inorganic dielectric layer may comprise more than 80%, more than 90%, more than 95%, approximately 100% or 100% by weight or by volume.

An organic material is typically any material or compound which comprises a carbon atom bonded to a hydrogen atom, i.e. a C—H bond. An organic compound may for example be a polymer. In examples a polymer is a molecule formed of a plurality of repeating monomer molecules as the skilled person will understand, for example linked together to form a backbone of the polymer molecule. As will be appreciated by the skilled person, the repeating monomer molecules may not all be the same; for example the organic compound may be a co-polymer comprising a repetition of two different monomer molecules in an arbitrary ratio. In examples, the organic material comprises a plurality of polymer molecules which together may form an amorphous solid material; the term amorphous is considered to mean that a material is substantially, for example predominantly, or entirely, non-crystalline. A non-crystalline material for example has no crystalline structures, or is not predominantly crystalline, a crystalline structure having a regular structure, for example with an ordered arrangement of atoms therein, which for example are arranged as a two dimensional or three dimensional lattice. In other examples, the organic material may comprise a polymer with a substantially (for example predominantly, or entirely) crystalline structure, which for example has an ordered arrangement of molecule chains, such as folded chains.

In contrast, an inorganic material is, in examples, any material or compound which is not organic. Therefore, an inorganic material or compound may not include carbon or may not include a carbon atom bonded to a hydrogen atom (i.e. a C—H bond). An inorganic material may for example be a crystalline material, for example due to formation using a vapour deposition process such as those described herein. In other examples, an inorganic material may be amorphous. An inorganic material may be considered to comprise atoms which form one or more lattices, for example, with a structure which is crystalline or amorphous.

The organic dielectric material may comprise one or more of: poly(vinylidene fluoride) ($—(C_2H_2F_2)n-$), poly(vinylidene fluoride) comprising titanium dioxide ($TiO_2$) particles, poly(vinylidene fluoride) comprising zirconium dioxide ($ZrO_2$) particles, poly(vinylidene fluoride-co-hexafluoropropylene) ($(—CH_2CF_2-)_x(—CF_2CF(CF_3)—)_y$), poly(vinylidene fluoride-co-hexafluoropropylene) comprising titanium dioxide particles, poly(vinylidene fluoride-co-hexafluoropropylene) comprising zirconium dioxide particles, poly(vinyl alcohol) ($(CH_2CH(OH))_n$), poly(vinyl alcohol) comprising titanium dioxide particles, poly(vinyl alcohol) comprising zirconium dioxide particles, cyanoEthylPullulan ($C_6H_7O_2(OR)_3)_n$, where R=H or $CH_2CH_2CN$), cyanoEthylPullulan comprising titanium dioxide particles, cyanoEthylPullulan comprising zirconium dioxide particles, polyimide ($C_{22}H_{10}N_2O_5$), polyimide comprising titanium dioxide particles, polyimide comprising zirconium dioxide particles or an organosilicon-based material, for example an organosilicon-based thin film where an organosilicon-based material in examples is a compound or compounds comprising at least one carbon-silicon bond, as the skilled person will appreciate. x, y, z and n are in the examples above and below each an integer. As the skilled person will appreciate, these materials are readily available commercially and, for example, may be formed from a solution or from a chemical reaction, such as a polymerisation reaction, during deposition, as will be described in more detail below for examples. In examples, the second layer may comprise one or more of: a thermoplastic polymer (for example a material which becomes fluid with plastic properties upon heating and hardens on cooling), a thermoset polymer (for example a material which is a fluid, for example with plastic properties, which hardens upon heating and/or exposure to radiation), or a co-polymer (for example a polymer formed of at least two different monomers). It is noted that where titanium dioxide or zirconium dioxide is referred to as comprised by a polymer material, that dioxide is for example dispersed within the polymer material.

The inorganic dielectric material may comprise one or more of: silicon oxide ($SiO_x$), for example silicon dioxide ($SiO_2$), silicon nitride (a-$Si_xN_yH_z$), aluminium oxide ($Al_xO_y$), tantalum oxide ($Ta_2O_5$), hafnium oxide ($HfO_2$), titanium dioxide ($TiO_2$), or zirconium dioxide ($ZrO_2$). For example, the first layer may comprise one or more of: an oxide, a nitride, an oxy-nitride, a carbide, or a carbo-nitride. A first layer comprising one or more of these compounds in examples may be applied, for example deposited, directly using methods such as sputter deposition or physical vapour deposition or can be formed by a chemical reaction during deposition from a precursor in a reaction chamber or in contact with the substrate, such as chemical vapour deposition, plasma-enhanced chemical vapour deposition or atomic layer deposition. For example, a first layer may be applied, for example deposited, upon introducing a gas or liquid precursor to a plasma. For example, silicon nitride may be deposited from argon (Ar), ammonia ($NH_3$), silane ($SiH_4$), nitrogen ($N_2$) and/or hydrogen ($H_2$), silicon dioxide may be deposited from hexamethyldisiloxane (HMDSO) liquid and oxygen ($O_2$) and aluminium oxide may be deposited from trimethylaluminium liquid (TMA) and Argon (Ar) gas.

Figure 6:
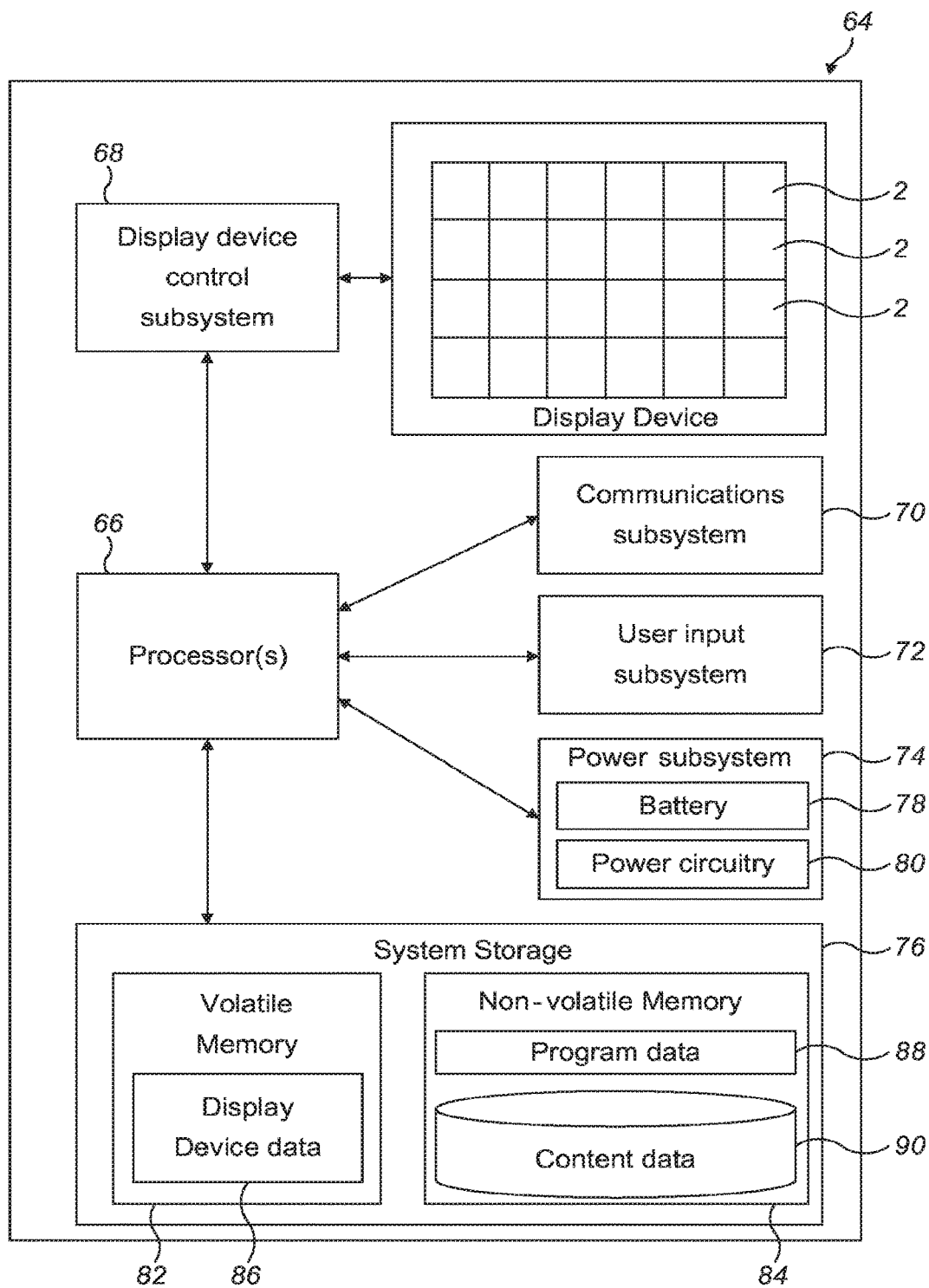
FIG. 6 shows a schematic system diagram of an example apparatus including an electrowetting display device.

FIG. 6 shows schematically a system diagram of an example system, for example apparatus 64, comprising an electrowetting display device such as the electrowetting display device 1 described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 64. The apparatus includes at least one processor 66 connected to and therefore in data communication with for example: a display device control subsystem 68, a communications subsystem 70, a user input subsystem 72, a power subsystem 74 and system storage 76. The display device control subsystem is connected to and is therefore in data communication with the display device 1. The at least one processor 66 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 76. The at least one processor may additionally, or in the alternative, contain memory, such as processor registers.

The display device control subsystem 68 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 70 for example is configured for the apparatus to communicate with for example a computing device via a data network, for example a computer network such as the Internet, a local area network, a wide area network, a telecommunications network, a wired network, a wireless network, or some other type of network. The communications subsystem 70 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 72 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 74 for example includes power circuitry 80 for use in transferring and controlling power consumed by the apparatus. The power may be provided by a mains electricity supply or from a battery 78, via the power circuitry. The power circuitry may further be used for charging the battery from a mains electricity supply.

The system storage 76 includes at least one memory, for example at least one of volatile memory 82 and non-volatile memory 84 and may comprise a non-transistory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 6, the volatile memory 82 stores for example display device data 86 which is indicative of display effects to be provided by the display device 1. The processor 66 may transmit data, based on the display device data, to the display device control subsystem 68 which in turn outputs signals to the display device for applying voltages to the display elements, for providing display effects from the display device. The non-volatile memory 84 stores for example program data 88 and/or content data 90. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
   a first fluid;
   a second fluid immiscible with the first fluid;
   a support plate comprising:
   an electrode;
   a surface;
   a substrate;
   an inorganic dielectric layer located between the substrate and the surface and transmissive to light in the visible spectrum, the inorganic dielectric layer having a first deformation behaviour; and
   an organic dielectric layer located between the substrate and the surface, in contact with the inorganic dielectric layer, and transmissive to light in the visible spectrum, the organic dielectric layer having a second deformation behaviour, the first deformation behaviour substantially equal to the second deformation behaviour,
   wherein at least one of the inorganic dielectric layer or the organic dielectric layer has at least one of:
   a resistance to electric field degradation in the presence of an applied voltage of up to 50 volts magnitude,
   a dielectric constant substantially equal to or higher than 3.5,
   a water vapour transmission rate less than $10^{-5}$ g/m$^2$/day or less than $10^{-4}$ g/m$^2$/day, or
   a leakage current of less than 0.1 nA/cm$^2$.

2. The electrowetting element according to claim 1, comprising an adhesion layer adhering the organic dielectric layer to the inorganic dielectric layer.

3. The electrowetting element according to claim 2, wherein the adhesion layer is at least one of:
   transmissive to visible light; or
   a monolayer.

4. The electrowetting element according to claim 1, comprising an adhesion promoter material adhering the organic dielectric layer to the inorganic dielectric layer, the adhesion promoter material comprising at least one of: a silane, a siloxane, titanium, or an organic titanate.

5. The electrowetting element according to claim 1,
   the inorganic dielectric layer comprising silicon nitride;
   the organic dielectric layer comprising polyimide; and
   the electrowetting element comprising an adhesion promoter material adhering the inorganic dielectric layer to the organic dielectric layer, the adhesion promoter material comprising an organic titanate.

6. The electrowetting element according to claim 1, wherein
   the inorganic dielectric layer has a compressive stress and the organic dielectric layer has a corresponding tensile stress; or
   the inorganic dielectric layer has a tensile stress and the organic dielectric layer has a corresponding compressive stress.

7. The electrowetting element according to claim 1, wherein, at a predetermined temperature, the inorganic dielectric layer has a first coefficient of thermal expansion value and the organic dielectric layer has a second coefficient of thermal expansion value less than 10 times, less than 5 times, less than 3 times, less than 2 times, less than, or equal to the first coefficient of thermal expansion value.

8. The electrowetting element according to claim 1, wherein
   the inorganic dielectric layer has a zero stress, or
   the inorganic dielectric layer has a tensile stress.

9. The electrowetting element according to claim 1, comprising:
   a fluid contact layer comprising the surface, wherein at least one of the first fluid or the second fluid is in contact with the fluid contact layer; and
   a barrier layer disposed between, and in contact with, the electrode and the fluid contact layer, the barrier layer comprising the inorganic dielectric layer and the organic dielectric layer, wherein the inorganic dielectric layer is a first inorganic dielectric layer and the organic dielectric layer is a first organic dielectric layer, the barrier layer further comprising:
   a second inorganic dielectric layer, separated from the first inorganic dielectric layer by, and in contact with, the first organic dielectric layer; and
   a second organic dielectric layer, separated from the first organic dielectric layer by, and in contact with, the second inorganic dielectric layer, the second organic dielectric layer closer to the surface than the second inorganic dielectric layer.

10. A method of manufacturing an electrowetting element, the method comprising:
   a) forming an inorganic dielectric layer over an underlying layer, the inorganic dielectric layer transmissive to visible light;
   b) treating a surface of the inorganic dielectric layer to generate an activated surface;
   c) forming an adhesion promoter layer on the activated surface; and d) forming an organic dielectric layer on the adhesion promoter layer, the organic dielectric layer transmissive to visible light, wherein at least one of the inorganic dielectric layer or the organic dielectric layer has at least one of:
- a resistance to electric field degradation in the presence of an applied voltage of up to 50 volts magnitude,
- a dielectric constant substantially equal to or higher than 3.5,
- a water vapour transmission rate less than $10^{-5}$ g/m²/day or less than $10^{-4}$ g/m²/day, or
- a leakage current of less than 0.1 nA/cm².

11. The method according to claim 10, wherein
the inorganic dielectric layer comprises silicon nitride;
the organic dielectric layer comprises polyimide; and
the adhesion promoter layer comprises an organic titanate.

12. The method according to claim 10, wherein the treating the surface of the inorganic dielectric layer comprises exposing the surface of the inorganic dielectric layer to ozone and ultraviolet light.

13. The method according to claim 10, wherein the adhesion promoter layer is at least one of:
transmissive to visible light, or
a monolayer.

14. The method according to claim 10, wherein the inorganic dielectric layer has a first deformation behaviour and the organic dielectric layer has a second deformation behaviour, the first deformation behaviour substantially equal to the second deformation behaviour.

15. An apparatus comprising:
an electrowetting element comprising:
a first fluid;
a second fluid immiscible with the first fluid;
a support plate comprising:
an electrode;
a surface;
a substrate;
an inorganic dielectric layer located between the substrate and the surface and transmissive to light in the visible spectrum, the inorganic dielectric layer having a first deformation behaviour; and
an organic dielectric layer located between the substrate and the surface, in contact with the inorganic dielectric layer, and transmissive to light in the visible spectrum, the organic dielectric layer having a second deformation behaviour, the first deformation behaviour substantially equal to the second deformation behaviour,
wherein at least one of the inorganic dielectric layer or the organic dielectric layer has at least one of:
a resistance to electric field degradation in the presence of an applied voltage of up to 50 volts magnitude,
a dielectric constant substantially equal to or higher than 3.5,
a water vapour transmission rate less than $10^{-5}$ g/m²/day or less than $10^{-4}$ g/m²/day, or
a leakage current of less than 0.1 nA/cm²;
at least one processor; and
at least one memory comprising computer program instructions, the at least one memory and the computer program instructions operable to, with the at least one processor, control the electrowetting element.

16. The apparatus according to claim 15, comprising an adhesion promoter material adhering the organic dielectric layer to the inorganic dielectric layer.

17. The apparatus according to claim 16, the adhesion promoter material comprising at least one of: a silane, a siloxane, titanium, or an organic titanate.

18. The apparatus according to claim 15,
the inorganic dielectric layer comprising silicon nitride;
the organic dielectric layer comprising polyimide; and
the electrowetting element comprising an adhesion promoter material adhering the inorganic dielectric layer to the organic dielectric layer, the adhesion promoter material comprising an organic titanate.

19. The apparatus according to claim 15, wherein, at a predetermined temperature, the inorganic dielectric layer has a first coefficient of thermal expansion value and the organic dielectric layer has a second coefficient of thermal expansion value less than 10 times, less than 5 times, less than 3 times, less than 2 times, less than, or equal to the first coefficient of thermal expansion value.

* * * * *